United States Patent [19]

Leckart et al.

[11] Patent Number: 4,584,362

[45] Date of Patent: Apr. 22, 1986

[54] BISMUTH CATALYST SYSTEM FOR PREPARING POLYURETHANE ELASTOMERS

[75] Inventors: Arthur R. Leckart, Woodbridge; H. Victor Hansen, Denville, both of N.J.

[73] Assignee: Cosan Chemical Corporation, Carlstadt, N.J.

[21] Appl. No.: 706,439

[22] Filed: Feb. 27, 1985

[51] Int. Cl.$^4$ .................... C08G 18/14; C08G 18/22
[52] U.S. Cl. ...................................... 528/55; 521/123; 521/124
[58] Field of Search .................. 528/55; 521/123, 124

[56] References Cited

U.S. PATENT DOCUMENTS

| | | | |
|---|---|---|---|
| 3,203,932 | 8/1965 | Frisch et al. | 528/55 |
| 3,245,957 | 4/1966 | Henderman et al. | 528/55 |
| 3,714,077 | 1/1973 | Cobbledick et al. | 521/88 |
| 3,799,898 | 3/1974 | Lamplugh et al. | 260/2.5 |
| 4,284,751 | 8/1981 | Hutt et al. | 528/55 |
| 4,468,478 | 8/1984 | Dexheimer et al. | 521/125 |

*Primary Examiner*—Herbert S. Cockeram
*Attorney, Agent, or Firm*—Pennie & Edmonds

[57] ABSTRACT

Processes are provided for preparing polyurethane elastomers by reacting a polyether or polyester polyol with a polyisocyanate in the presence of a catalytic amount of a bismuth salt of a carboxylic acid having from 2 to 20 carbon atoms. The catalysts of these processes are relatively non-toxic, yet they promote rapid polymerization for a wide variety of polyurethane elastomeric applications.

9 Claims, No Drawings

BISMUTH CATALYST SYSTEM FOR PREPARING POLYURETHANE ELASTOMERS

BACKGROUND OF INVENTION

Urethane polymers or polyurethanes are a large family of polymers with widely varying properties and uses, all based on the reaction product of an organic isocyanate with compounds containing a hydroxyl group. Polyurethane polymers are generally classified into two broad categories: A. foam or urethane foam, and B. elastomers or polyurethane elastomers. Polyurethane foams are polyurethane polymers produced by the reaction of polyisocyanates with an hydroxyl group from a polyol and a polymerization catalyst, in the presence of water and/or an auxiliary blowing agent, such as monofluorotrichloromethane, which allows the polymeric mass to expand into a cellular mass upon reaction. In preparing a polyurethane elastomer, no blowing agent or mechanism for producing gas which would lead to cell development is present. Therefore, the polymer is produced by the reaction of the isocyanate with a hydroxyl group to form urethane linkages in the presence of a polymerization catalyst.

Polyurethane elastomers have been widely used in a variety of applications. They have been used as protective coatings, in the insulation of electrical elements, as caulks, sealants, gaskets, etc. Because of favorable rheology of an elastomer formulation, they can be used to cast intricate forms such as found in the toy industry. They have also been widely used in the preparation of sporting goods, fabric coatings and shoe soles wherein the cured urethane elastomer comes in repeated intimate contact with human beings. The prior art catalysts used to prepare elastomers frequently contained toxic mercury and lead compounds and the toxicity was carried over into the cured elastomer. If less toxic organotin compounds are employed as catalysts, elastomers having physical properties less than optimum are obtained.

There are several patents relating to various catalysts for reacting isocyanates with polyether polyols. U.S. Pat. No. 3,245,957 to Henderman et al describes a process for reacting an isocyanate with an active hydrogen compound in the presence of an antimony containing catalyst.

U.S. Pat. No. 3,203,932 to Frisch et al relates to a process for preparing urethane-urea elastomers using metal organic catalysts such as lead, cobalt and zinc napthenates.

U.S. Pat. No. 4,468,478 to Dexheimer et al discloses polyurethanes prepared from polyoxyalkylenes containing alkali metal or alkaline earth metal catalyst residues chelated with benzoic acid derivatives.

U.S. Pat. No. 3,714,077 to Cobbledick et al relates to a urethane foam catalyst system consisting of a combination of polyol-soluble organic stannous compounds with polyol-soluble organic bismuth and or antimony compounds with certain sterically hindered tertiary amines.

BRIEF DESCRIPTION OF THE INVENTION

The instant invention relates to a process for preparation of polyurethane elastomers by reacting polyether or polyester polyols having molecular weights of between 1000 and 10,000, possibly in conjunction with smaller percentage of lower molecular weight glycols, which provides for a balance of physical properties required, with an organic polyisocyanate, wherein the ratio of NCO groups to hydroyl groups is from 0.70 to 1 to 1.35 to 1, in the presence of a catalytic amount of a bismuth salt of a carboxylic acid having from 2 to 20 about carbon atoms in the molecule. The catalyst is present as about 0.01 to 1.5 weight percent based on the weight of the reactants.

Polyurethane elastomer can be prepared utilizing three methods: 1. Full Isocyanate Prepolymer, 2. Quasi-Prepolymer; and 3. One-Shot Method.

In the Isocyanate Prepolymer Method: The isocyanate is reacted with high molecular weight polyol producing an NCO terminated prepolymer. At the time of use, a chain extender (if used) and catalyst is added by the processor.

Quasi-Prepolymer Method—Part of the high molecular weight polyol is reacted with an isocyanate. The processor blends the remaining polyol, chain extender (if used) and catalyst together with the quasi-prepolymer prior to elastomer manufacture.

One-Shot Method—The isocyanate stands alone. The polyol chain extender (if used) and catalyst are mixed and added to the isocyanate by the processor.

DETAILED DESCRIPTION OF THE INVENTION

The catalysts of the instant invention are prepared by reacting a bismuth salt with a carboxylic acid having 2 to 20 carbon atoms in the molecule, preferably 8 to 12 carbon atoms in the molecule. More specifically, bismuth tris(neodecanoate) has been determined to be a particularly effective catalyst for two component urethane elastomer systems. The useful carboxylic acids are represented by the formula RCOOH wherein R is a hydrocarbon radical containing 1 to about 19 carbon atoms. R can be alkyl, cycloalkyl aryl, alkaryl such as methyl, ethyl, propyl, isopropyl, neopentyl, octyl, neononyl, cyclohexyl, phenyl, tolyl or napthyl.

The primary use of the catalyst is to accelerate the reaction between the isocyanate and the hydroxyl groups. The catalyst can be employed in a wide range of elastomer formulation systems where reduced catalyst toxicity is desirable. The catalyst provides an alternative to the use of catalysts based on lead, tin or mercury.

Catalysts in use prior to this invention all had the capability of promoting reaction between a hydroxyl group and isocyanates to produce urethane linkages and, ultimately, polyurethane products. The major disadvantage of organomercury based catalysts is that, as supplied, they must be handled with extreme caution due to their classification as poisons and the shipping containers must be managed under the Resources Conservation and Recovery Act as hazardous waste. Organolead catalysts must also be handled with a great deal of caution due to their toxicity classification as a hazardous substance under the Resources Conservation and Recovery Act. Primarily due to these questions of toxicity and handling, the use of organotin catalysts in non-cellular urethane systems has occurred. As a class, organotin compounds do not provide the same type of catalytic performance as organomercury and organolead compounds, since organotin compounds also promote the reaction between moisture and isocyanates in addition to the hydroxyl group-isocyanate reaction. The non-specific nature of the tin catalysts makes their use difficult, with the processor required to go to extreme measures to reduce the presence of moisture in order to eliminate bubbling or pinhole formation in the elastomers obtained.

In addition, when using catalysts based on mercury, lead or tin, monitoring of the work place environment must be done in order to ascertain ambient air quality compliance with Occupational Safety and Health Administration Standards ("OSHA").

The catalyst of this invention provides optimum performance based on tailored gel times, rapid release or demold times and will not contribute to embrittlement of the cured elastomer. The catalyst of the instant invention, as a polymerization catalyst, has minimal effect on the water/isocyanate reaction with moisture levels normally found in a wet/undried formulated urethane system. Most importantly, the catalyst has an excellent acute toxicity profile. No occupational exposure limit standard must be met when using the catalyst.

In contrast to the organomercury compounds, the lead salts of organic acids and organotin compound catalysts of the instant invention have the following toxicity profile:

Oral $LD_{50}$: 3 Grams/Kilogram
Dermal $LD_{50}$: 2 Grams/Kilogram
Inhalation $LC_{50}$: 3 Milligrams/Liter It is apparent, therefore, that, when contrasting these toxicity indicators with organomercury compounds and lead salts of organic acids, the bismuth compounds of this invention are orders of magnitude less toxic. The toxicity profiles of organotin based chemicals are somewhat poorer, but within the same order of magnitude as the compounds of this invention, but when considering their limitations based on moisture sensitivity and OSHA monitoring requirements, the safety and ease of use of the compounds of this invention are evident.

The primary hydroxy containing reactants used in the preparation of the polyurethane elastomers of the present invention are primary and secondary hydroxy terminated polyalkylene ethers and polyesters having from 2 to 4 hydroxyl groups and a molecular weight of from about 1000 to 10,000. They are liquids or are capable of being liquified or melted for handling.

Examples of polyalkylene polyols include linear and branched polyethers having a plurality of ether linkages and containing at least 2 hydroxyl groups and being substantially free from functional groups other than hydroxyl groups. Typical examples of the polyalkylene polyols which are useful in the practice of the invention are the polyethylene glycols, polypropylene glycols and polybutylene ether glycols. Linear and branch copolyethers of ethylene oxide and propylene oxide are also useful in preparing the elastomers of this invention. Those having molecular weights of from 2000 to 5000 are preferred. Polyethers having a branch chain network are also useful. Such branch chain polyethers are readily prepared from alkylene oxides and initiators having a functionality greater than 2.

Any organic di or tri isocyanate can be used in the practice of the present invention. Diisocyanates are preferred. Examples of suitable organic polyisocyanates are the trimethylene diisocyanate, tetramethylene diisocyanate, pentamethylene diisocyanate and hexamethylene diisocyanate. Examples of aromatic diisocyanates include 2,4 tolylene diisocyanate, and 2,6 tolylene diisocyanate. In addition, methylene diphenyldiisocyanates and polymeric isocyanates based on methylene diphenyldiisocyanates can be employed.

The amount of polyisocyanate employed ranges from about 0.7 to 1.3 mole of NCO in the polyisocyanate per mole of active hydrogen in the polyols.

In certain instances it may be desirable to add a chain extender to complete the formulation of polyurethane polymers by reacting isocyanate groups of adducts or prepolymers. Examples of some types of polyol chain extenders include 1,4 butanediol, diethylene glycol, trimethylol propane and hydroquinone di(beta hydroxyethyl ether).

The chain extender when present is added as 1 to 20 weight percent, preferably 3 to 6 weight percent based on the weight of the reactants. The invention is illustrated by the following specific but nonlimiting examples.

Example I is a description of the preparation of bismuth salts of the instant invention.

EXAMPLE I

A typical laboratory preparation of a Bismuth Salt of an Organic Acid is as follows:

0.215 moles of purified Bismuth Trioxide, and 1.3 moles of an organic acid were charged to a 500 ml. three neck flask equipped with agitator, condenser, and thermometer. These materials were reacted at 90–100 Degrees Centigrade for seven hours, at which time the reactants were heated to 124 Degrees Centigrade under vacuum to remove water of reaction.

The resulting product was vacuum filtered at 90 Degrees Centigrade with the use of a filter-aid. The finished product weighed 196 grams for a yield of 74.7%. It was assayed at 17.1% Bismuth, had a Gardner Viscosity of V and a Gardner Color of 4.

Typical acids employed singly or in combination were Acetic, Propionic, 2-Ethyl Hexanoic and Isononanoic at mole ratios equivalent to approximately 6 moles of acid to mole of 1 Bismuth.

EXAMPLE II

A series of runs were completed to determine gel time and hardness of elastomers prepared with catalysts of this instant invention. In each of the runs, 91 grams of polyol and 0.5 grams of catalyst were weighed into a container. The components were mixed in a Hamilton Beach Mixer until a temperature of 100 Degrees F. was reached. At that time, 9 grams of a commercially available TDI based isocyanate was added and the time for the liquid composition to be converted into a gel was recorded. The hardness of the vulcanizates was determined following a 72 hour room temperature post-cure.

| CATALYST % ON COMPOSITION | BISMUTH CONTENT | ORGANIC ACID UTILIZATION BASED ON 1 M BISMUTH | GEL TIME SECONDS | SHORE A DUROMETER |
|---|---|---|---|---|
| 0.50 | 16.3% | 6 m Neodecanoic Acid | 7 | 73 |
| 0.50 | 16.4% | 1 m 2-Ethyl Hexanoic Acid 5 m Neodecanoic Acid | 12 | 68 |
| 0.50 | 17.2% | 3 m 2-Ethyl Hexanoic Acid 3 m Propionic Acid | 35 | 65 |
| 0.50 | 17.2% | 3 m 2-Ethyl Hexanoic Acid | 33 | 65 |

-continued

| CATALYST % ON COMPOSITION | BISMUTH CONTENT | ORGANIC ACID UTILIZATION BASED ON 1 M BISMUTH | GEL TIME SECONDS | SHORE A DUROMETER |
|---|---|---|---|---|
| | | 3 m Neodecanoic Acid | | |
| 0.50 | 19.2% | 6 m 2-Ethyl Hexanoic Acid | 35 | 65 |
| 0.50 | 24.0% | 3 m 2-Ethyl Hexanoic Acid | 77 | 48 |
| 0.50 | 28.9% | 3 m Neodecanoic Acid | 26 | 60 |

The Shore A value is a standard Durometer test under ASTM Method D676. An instrument (Shore A Durometer) is used to determine hardness of an elastomer by measuring penetration (or resistance to penetration) of a point pressed on the surface. The instrument has hardness scales ranging from 0 (very soft) to 100 (very hard).

The above data show clearly that the products of this invention provide cures for room temperature cured polyurethane systems which are in large part independent of the bismuth concentration.

EXAMPLE III

Another procedure used to evaluate the performance of listed polyurethane catalysts in cast elastomers is as follows:

Liquid prepolymers were heated to 60 Degrees Centigrade to obtain flow viscosity. Higher temperatures were required to melt solid prepolymers. The chain extender, 1-4 butanediol, was warmed slightly to facilitate mixing. The chain extender, catalyst and prepolymer were thoroughly mixed together by hand for sixty seconds. Castings were press cured for twenty minutes at 250 Degrees Fahrenheit followed by post-cure for sixteen hours at 180 Degrees Fahrenheit. Vulcanizates were allowed to equilibrate at room temperature for twenty-four hours minimum before testing.

Dumbells were cut from the slabs, and Shore A Durometers were determined. Dumbells were elongated on the Dillon Testing Machine at 2.11 inches/minute to determine tensile and elongation.

| CATALYST | % ON PREPOLYMER | SHORE A | lb./in$^2$ TENSILE | percentage ELONGATION |
|---|---|---|---|---|
| COMMERCIAL PREPOLYMER A/100 PARTS CHAIN EXTENDER 1-4 BUTANEDIOL/6.8 PARTS | | | | |
| dibutyltin dilaurate | 0.025 | 85 | 877* | 840* |
| bismuth tris (neodecanoate) | 0.025 | 81 | 2150* | 840* |
| Phenyl Mercury Carboxylate | 0.10 | 84 | 1870* | 840* |
| COMMERCIAL PREPOLYMER B/100 PARTS CHAIN EXTENDER 1-4 BUTANEDIOL/6.3 PARTS | | | | |
| dibutyltin dilaurate | 0.025 | 81 | 730* | 800* |
| bismuth tris (neodecanoate) | 0.10 | 83 | 730* | 800* |
| Phenyl Mercury Carboxylate | 0.10 | 82 | 835* | 800* |
| COMMERCIAL PREPOLYMER C/100 PARTS CHAIN EXTENDER 1-4 BUTANEDIOL/6.7 PARTS | | | | |
| dibutyltin dilaurate | 0.05 | 84 | 1570* | 840* |
| bismuth tris (neodecanoate) | 0.10 | 80 | 1550* | 840* |
| Phenyl Mercury Carboxylate | 0.10 | 82 | 2100* | 840* |

*Specimen Unbroken

It is apparent from the data that the catalysts of the instant invention compare favorably with dibutyltin dilaurate and phenyl mercury carboxylate in preparing polyurethane elastomers.

EXAMPLE IV

A series of runs were conducted to characterize the viscosity build of an MDI based polyurethane composition as influenced by various catalysts, including bismuth, mercury, tin and lead compounds.

The formulation consisted of a commercial high molecular weight polyol (249 grams), chain extender 1, 4 butanediol (39 grams) and catalyst as required. The polyol blend (72.0 grams) was mixed with MDI (33.75 grams). Cures were conducted at 25 Degrees Centigrade.

After the polyols and isocyanates were mixed together, the viscosities were measured continuously through gellation. Viscosities were determined by a Brookfield Viscosimeter, Model RV, Number 6 Spindle, at 1 RPM.

| | MDI SYSTEM | | | |
|---|---|---|---|---|
| ELAPSED TIME/ SECONDS | PHENYL MERCURY CARBOXY- LATE | BISMUTH | ORGANOTIN | LEAD |
| 0 | 5000 | 5000 | 5000 | 5000 |
| 60 | 5000 | 5000 | 5000 | 5000 |
| 180 | 5000 | 5000 | 5000 | 5000 |
| 250 | 5000 | 5000 | 20,000 | 500,000 |
| 300 | 5000 | 5000 | 500,000 | 500,000 |
| 360 | 5000 | 5000 | 500,000 | 500,000 |
| 420 | 5000 | 5000 | | |
| 600 | 5000 | 500,000 | | |
| 750 | 500,000 | | | |

These data show that the working time (flow time) of bismuth cured systems most nearly approaches that of phenyl mercury compounds and, therefore, in areas where catalyst toxicity must be given consideration, the products of this invention most closely provide the gel profile of a long induction time at uniform viscosity prior to gellation which is the desired gel curve characteristic.

EXAMPLE V

In areas where catalyst toxicity is not of paramount importance, the use of organomercury catalysts is extensive. The only negative physical characteristic which these catalyzed systems exhibit is the potential for cured systems to exhibit polyurethane degradation or, in effect, for the mercury to act as a depolymerization agent. This phenomenon is related to the temperature and/or humidity of the environment into which the cured polyurethane is exposed. Another major advantage to the use of the products of this instant invention is the lack of polymer degradation which the cured elastomer exhibits upon exposure to conditions which would render mercury catalyzed polyurethane elastomer unfunctional. The use of polyurethane elastomers to fill tires is an area which has received much attention. It has been a practice in the industry that the addition of sulfur to a mercury containing polyurethane formulation would chemically bind the mercury catalyst so that depolymerization would not take place. The data below indicate that the use of the catalyst of this invention is superior to that currently being employed. The same formulation as discussed in Example I above was utilized in the run described below.

| CATALYST | GEL TIME/ SECONDS | SHORE HARDNESS INITIAL | SHORE A HARDNESS AFTER BEING EXPOSED TO BOILING WATER FOR 32 HOURS |
|---|---|---|---|
| Phenyl Mercury Carboxylate | 113 | 65 | Soft Paste |
| Phenyl Mercury Carboxylate Plus Equivalent Weight Of Sulfur | 74 | 61 | 42 |
| Phenyl Mercury Carboxylate Plus Five Times Weight Of Sulfur | 90 | 62 | 50 |
| Phenyl Mercury Carboxylate Plus Ten Times Weight Of Sulfur | 96 | 65 | 53 |
| Bismuth tris (neodecanoate) Catalyst | 180 | 67 | 60 |
| Bismuth tris (neodecanoate) Catalyst Plus Equivalent Weight Of Sulfur | 177 | 68 | 61 |
| Bismuth tris (neodecanoate) Catalyst Plus Five Times Weight Of Sulfur | 157 | 71 | 60 |
| Bismuth tris (neodecanoate) Catalyst Plus Ten Times Weight of Sulfur | 83 | 75 | 63 |

What is claimed is:

1. A process for preparing a polyurethane elastomer by reacting a polyol selected from polyether polyols and polyester polyols with an organic polyisocyanate wherein the ratio of NCO groups to hydroxyl groups is from 0.70 to 1 to 1.35 to 1 in the presence of a catalytic amount of a bismuth salt of a carboxylic acid having from 2 to 20 carbon atoms in the molecule, which salt is the sole catalyst in the reaction mixture.

2. The process according to claim 1 wherein the polyol has a molecular weight of 1000 to 10,000.

3. The process according to claim 1 wherein the reaction is performed in the presence of about 0.01 to 1.5 weight percent, based on the weight of the reactants, of a bismuth salt of a carboxylic acid having from 2 to 20 carbon atoms in the molecule.

4. The process according to claim 1 wherein the reaction is performed in the presence of about 0.01 to 1.5 weight percent, based on the weight of the reactants, of a bismuth salt of a carboxylic acid having from 8 to 12 carbon atoms in the molecule.

5. The process according to claim 1 wherein the reaction is performed in the presence of 0.05 to 1.5 percent, based on the weight of the reactants, of bismuth tris(neodecanoate).

6. A process for preparing a polyurethane elastomer by reacting a polyol selected from polyether polyols and polyester polyols with an organic polyisocyanate, in the presence of an effective amount of a chain extender, wherein the ratio of NCO groups to hydroxyl groups is from 0.70 to 1 to 1.35 to 1, in the presence of a catalytic amount of a bismuth salt of a carboxylic acid having from 2 to 20 carbon atoms in the molecule, which salt is the sole catalyst in the reaction mixture.

7. The process according to claim 6 wherein the polyol has a molecular weight of 1000 to 10,000.

8. The process according to claim 6 wherein the reaction is performed in the presence of about 0.01 to 1.5 weight percent, based on the weight of the reactants, of a bismuth salt of a carboxylic acid having from 2 to 20 carbon atoms in the molecule and a 1 to 20 weight percent based on the weight of the reactants of a chain extender.

9. The process according to claim 6 wherein the chain extender is selected from 1,4 butanediol, diethylene glycol, trimethylol propane and hydroquinone di(-beta hydroxyethyl ether).

* * * * *

REEXAMINATION CERTIFICATE (1219th)

United States Patent [19]

Leckart et al.

[11] B1 4,584,362

[45] Certificate Issued    Mar. 13, 1990

[54] BISMUTH CATALYST SYSTEM FOR PREPARING POLYURETHANE ELASTOMERS

[75] Inventors: Arthur R. Leckart, Woodbridge; H. Victor Hansen, Denville, both of N.J.

[73] Assignee: Cosan Chemical Corporation, Carlstadt, N.J.

Reexamination Request:
No. 90/001,622, Oct. 17, 1988

Reexamination Certificate for:
Patent No.: 4,584,362
Issued: Apr. 22, 1986
Appl. No.: 706,439
Filed: Feb. 27, 1985

[51] Int. Cl.$^4$ ............................................. C08G 18/14
[52] U.S. Cl. ..................................... 528/55; 521/123; 521/124
[58] Field of Search .................... 528/55; 521/123, 124

[56] References Cited

U.S. PATENT DOCUMENTS

| | | | |
|---|---|---|---|
| 3,450,653 | 4/1973 | McClelland | 260/18 |
| 3,533,945 | 6/1971 | Robins | 252/49.6 |
| 3,583,945 | 7/1971 | Robins | 260/77.5 AB |
| 3,592,787 | 7/1971 | Robins | 260/18 |
| 3,691,135 | 9/1972 | Schulze et al. | 260/77.5 AP |
| 3,725,355 | 4/1973 | Parrish et al. | 260/77.5 AP |
| 3,901,852 | 8/1975 | Shah | 260/47 CB |
| 3,912,516 | 10/1975 | Recchia et al. | 96/85 |
| 3,929,732 | 12/1975 | Shah | 260/77.5 AN |
| 3,957,753 | 5/1976 | Hostettler et al. | 260/210 R |
| 4,034,038 | 7/1977 | Vogel | 260/462 R |
| 4,067,844 | 1/1978 | Barron et al. | 260/37 N |
| 4,115,301 | 9/1978 | Kennedy | 521/155 |
| 4,296,172 | 10/1981 | Hill | 428/331 |
| 4,306,052 | 12/1981 | Bonk et al. | 528/67 |
| 4,321,333 | 3/1982 | Alberino et al. | 521/159 |
| 4,349,663 | 9/1982 | Barsa et al. | 528/367 |
| 4,374,210 | 2/1983 | Ewen et al. | 521/159 |
| 4,385,133 | 5/1983 | Alberino et al. | 521/159 |
| 4,410,689 | 10/1983 | Barsa et al. | 528/367 |
| 4,412,033 | 10/1983 | LaBelle et al. | 524/590 |
| 4,426,485 | 1/1984 | Hoy et al. | 524/591 |
| 4,448,816 | 5/1984 | Barsa et al. | 427/388.2 |
| 4,497,913 | 2/1985 | Raes et al. | 521/137 |

FOREIGN PATENT DOCUMENTS 40469  11/1981  European Pat. Off. .
994348  6/1965  United Kingdom .

OTHER PUBLICATIONS

J. W. Britain et al. "Catalysis of the Isocyanate-Hydroxyl Reaction", *Journ. Applied Polymer Science* IV, 207–211 (1960).

*The Merck Index*, Tenth Edition 178 (1983).

N. J. Sax, "Dangerous Properties of Industrial Materials", Sixth Edition, 496 (1984).

*Primary Examiner*—John Kight, III

[57] ABSTRACT

Processes are provided for preparing polyurethane elastomers by reacting a polyether or polyester polyol with a polyisocyanate in the presence of a catalytic amount of a bismuth salt of a carboxylic acid having from 2 to 20 carbon atoms. The catalysts of these processes are relatively non-toxic, yet they promote rapid polymerization for a wide variety of polyurethane elastomeric applications.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 6, and 8 are determined to be patentable as amended.

Claims 2, 4–5, 7 and 9, dependent on an amended claim, are determined to be patentable.

New claims 10–14 are added and determined to be patentable.

1. A process for preparing a polyurethane elastomer by reacting a polyol selected from polyether polyols and polyester polyols with an organic polyisocyanate wherein the ratio of NCO groups to hydroxyl groups is from 0.70 to 1 to 1.35 to 1 in the presence of a catalytic amount of a bismuth salt of a carboxylic acid having from [2] *6* to 20 carbon atoms in the molecule *and a tertiary carbon group adjacent the carboxyl group, which* salt is the sole catalyst in the reaction mixture.

3. The process according to claim 1 wherein the reaction is performed in the presence of about 0.01 to 1.5 weight percent[, based on the weight of the reactants, of a bismuth salt of a carboxylic acid having from 2 to 20 carbon atoms in the molecule] *of said catalyst.*

6. A process for preparing a polyurethane elastomer by reacting a polyol selected from polyether polyols and polyester polyols with an organic polyisocyanate, in the presence of an effective amount of a chain extender, wherein the ratio of NCO groups to hydroxyl groups is from 0.70 to 1 to 1.35 to 1, in the presence of a catalytic amount of a bismuth salt of a carboxylic acid having from [2] *6* to 20 carbon atoms in the molecule *and a tertiary carbon group adjacent to the carboxyl group, which salt is the sole catalyst in the reaction mixture.*

8. The process according to claim 6 wherein the reaction is performed in the presence of about 0.01 to 1.5 weight percent, based on the weight of the reactants[, of a bismuth salt of a carboxylic acid having from 2 to 20 carbon atoms in the molecule] *of said catalyst* and [a] *1* to 20 weight percent based on the weight of the reactants of a chain extender.

*10. The process according to claim 6 wherein the reaction is performed in the presence of 0.05 to 1.5 percent, based on the weight of the reactants, of bismuth tris(neodecanoate).*

*11. A process for preparing a polyurethane elastomer by reacting a polyol selected from polyether polyols and polyester polyols with an organic polyisocyanate, in the presence of an effective amount of a chain extender, wherein the ratio of NCO groups to hydroxyl groups is from 0.70 to 1 to 1.35 to 1, in the presence of a catalytic amount of bismuth tris (neodecanoate) as the sole catalyst in the reaction mixture.*

*12. The process according to claim 11 wherein the reaction is performed in the presence of between about 1 and 20 weight percent based on the weight of the reactants of a chain extender.*

*13. The process according to claim 1 wherein the carboxylic acid has 8 to 12 carbon atoms.*

*14. The process according to claim 6 wherein the carboxylic acid has 8 to 12 carbon atoms.*

* * * * *